US011942251B2

(12) United States Patent
Kobayashi et al.

(10) Patent No.: US 11,942,251 B2
(45) Date of Patent: Mar. 26, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Takehito Kobayashi, Yokkaichi (JP); Seiji Shitama, Yokkaichi (JP); Kohei Yoshikawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 726 days.

(21) Appl. No.: 15/733,945

(22) PCT Filed: May 17, 2019

(86) PCT No.: PCT/JP2019/019764
§ 371 (c)(1),
(2) Date: Dec. 1, 2020

(87) PCT Pub. No.: WO2019/230458
PCT Pub. Date: Dec. 5, 2019

(65) Prior Publication Data

US 2021/0233694 A1 Jul. 29, 2021

(30) Foreign Application Priority Data

Jun. 1, 2018 (JP) ................................ 2018-106543

(51) Int. Cl.
*H01F 27/06* (2006.01)
*H01F 27/02* (2006.01)
(Continued)

(52) U.S. Cl.
CPC ........... *H01F 27/06* (2013.01); *H01F 27/022* (2013.01); *H01F 27/24* (2013.01); *H01F 27/30* (2013.01); *H01F 27/324* (2013.01); *H01F 37/00* (2013.01)

(58) Field of Classification Search
USPC ........................................................... 336/65
See application file for complete search history.

(56) References Cited

U.S. PATENT DOCUMENTS 2,494,350 A * 1/1950 Mittermaier .......... H01F 27/263 336/65
3,246,273 A * 4/1966 Reade .................. H01F 37/005 336/212
(Continued)

FOREIGN PATENT DOCUMENTS

JP 2012-209328 A 10/2012
JP 2013-219318 A 10/2013

OTHER PUBLICATIONS

English translation of CN103314419 (Year: 2015).*
International Search Report, Application No. PCT/JP2019/019764, dated Jul. 16, 2019. ISA/Japan Patent Office.

*Primary Examiner* — Ronald Hinson
(74) *Attorney, Agent, or Firm* — Honigman LLP

(57) ABSTRACT

A reactor includes a coil having a winding portion; a magnetic core; and a case. The magnetic core includes a plurality of core pieces forming a closed magnetic circuit. The core pieces include two outer core pieces having a portion disposed outside the winding portion. The case includes a first and a second opposing faces are respectively opposed to outer edge faces of the outer core pieces, and a case inclined surface provided on at least one of the first and the second opposing faces. The case inclined surface is inclined such that a distance between the first opposing face and the second opposing face decreases from an opening
(Continued)

side of the case toward an inner bottom face of the case, and a core inclined surface on the outer edge face side of the outer core piece is in surface contact with the case inclined surface.

9 Claims, 8 Drawing Sheets

(51) Int. Cl.

| | |
|---|---|
| ***H01F 27/24*** | (2006.01) |
| ***H01F 27/30*** | (2006.01) |
| ***H01F 27/32*** | (2006.01) |
| ***H01F 37/00*** | (2006.01) |

(56) References Cited

U.S. PATENT DOCUMENTS

| | | | | |
|---|---|---|---|---|
| 2010/0102912 | A1* | 4/2010 | Suzuki | H01F 37/00 336/65 |
| 2012/0139684 | A1* | 6/2012 | Kobayashi | H01F 27/306 336/92 |
| 2012/0194311 | A1* | 8/2012 | Suzuki | H01F 27/266 336/92 |
| 2012/0223794 | A1* | 9/2012 | Asakura | H01F 27/06 336/65 |
| 2013/0039815 | A1 | 2/2013 | Murata | |
| 2013/0050952 | A1 | 2/2013 | Sone et al. | |
| 2013/0249666 | A1* | 9/2013 | Suzuki | H01F 41/0206 29/605 |
| 2015/0357117 | A1* | 12/2015 | Suzuki | H01F 27/263 29/605 |
| 2018/0190421 | A1 | 7/2018 | Yoshikawa et al. | |

* cited by examiner

REACTOR

CROSS-REFERENCE TO RELATED APPLICATIONS

This application is the U.S. national stage of PCT/JP2019/019764 filed on May 17, 2019, which claims priority of Japanese Patent Application No. JP 2018-106543 filed on Jun. 1, 2018, the contents of which are incorporated herein.

TECHNICAL FIELD

The present disclosure relates to a reactor.

BACKGROUND

JP 2012-209328A discloses a reactor that is used for an on-board converter and the like. This reactor includes: a coil having a pair of winding portions; a magnetic core; a case that houses an assembly of the coil and the magnetic core; and a sealing resin that covers the assembly embedded in the case. The magnetic core is arranged inside and outside the winding portions. Also, the magnetic core includes a plurality of core pieces assembled in a ring shape.

There has been desire for a reactor that can favorably maintain a state in which core pieces are in contact with each other for a long period of time, and is also excellent in terms of manufacturability.

JP 2012-209328A discloses that a side wall portion of a case is made of resin, and two resin pressing protrusions protruding to the inward side of the case are respectively provided at opposite positions of the side wall portion, the resin pressing protrusions being integrated with the side wall portion. With the two pressing protrusions, the magnetic core is fastened in an axial direction of the winding portions. In this configuration, an adhesive for joining the core pieces together can be omitted. However, it is conceivable that the pressing protrusions, which are made of resin, may become too worn during assembling, or may deteriorate with time, for example. If the pressing protrusions become worn or deteriorate, the contact state of the core pieces may change. Due to this change, flux leakage is thought to occur from a gap between the core pieces.

Therefore, it is an object of the present disclosure to provide a reactor that can maintain a state in which core pieces are in contact with each other, and is also excellent in terms of manufacturability.

Effects of Present Disclosure

The reactor of the present disclosure can maintain a state in which core pieces are in contact with each other, and is also excellent in terms of manufacturability.

SUMMARY

According to the present disclosure, a reactor includes a coil having a winding portion, a magnetic core and a case. The magnetic core is disposed inside and outside the winding portion; and the case houses an assembly including the coil and the magnetic core. The magnetic core includes a plurality of core pieces that are assembled so as to form a closed magnetic circuit. The core pieces include two outer core pieces that include a portion disposed outside the winding portion. The case includes, on an inner wall surface thereof, a first opposing face and a second opposing face that are respectively opposed to outer edge faces of the outer core pieces, and includes a case inclined surface that is provided on at least one of the first opposing face and the second opposing face. The case inclined surface is inclined such that a distance between the first opposing face and the second opposing face decreases from an opening side of the case toward an inner bottom face of the case. A core inclined surface is provided on the outer edge face side of the outer core piece, and is in surface contact with the case inclined surface.

DETAILED DESCRIPTION OF PREFERRED EMBODIMENTS

Figure 1:
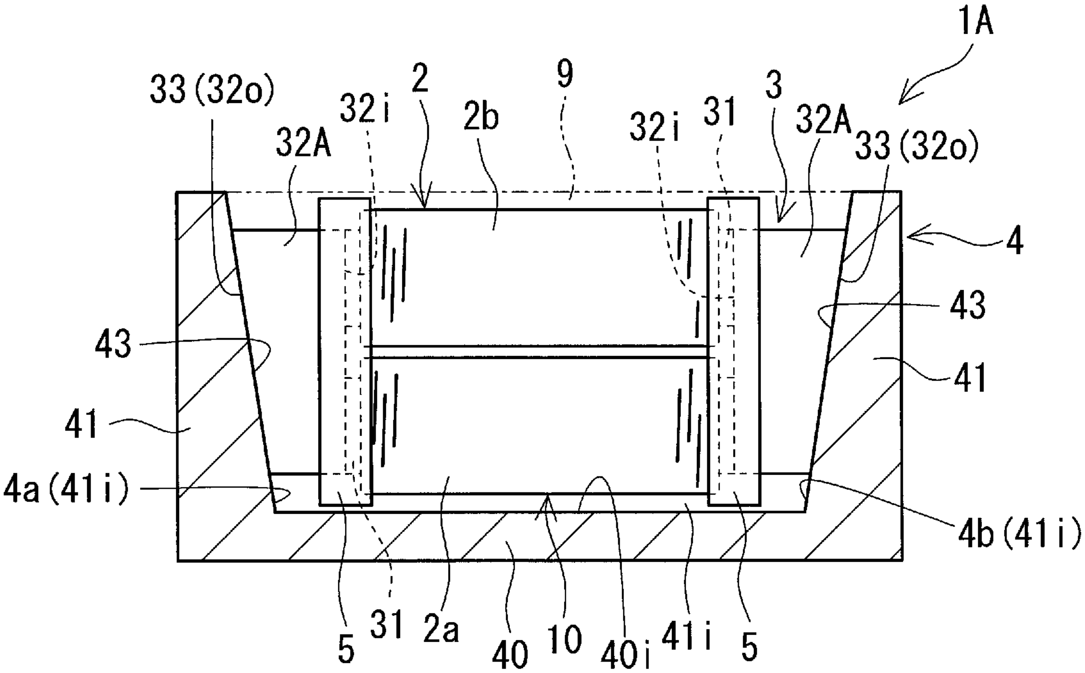
FIG. 1 is a schematic front view illustrating a reactor according to Embodiment 1.

First, embodiments of the present disclosure will be listed and described. A reactor according to one aspect of the present disclosure includes a coil having a winding portion, a magnetic core and a case. The magnetic core is disposed inside and outside the winding portion; and the case houses an assembly including the coil and the magnetic core. The magnetic core includes a plurality of core pieces that are assembled so as to form a closed magnetic circuit. The core pieces include two outer core pieces that include a portion disposed outside the winding portion. The case includes, on an inner wall surface thereof, a first opposing face and a second opposing face that are respectively opposed to outer edge faces of the outer core pieces, and includes a case inclined surface that is provided on at least one of the first opposing face and the second opposing face. The case inclined surface is inclined such that a distance between the first opposing face and the second opposing face decreases from an opening side of the case toward an inner bottom face of the case. A core inclined surface is provided on the outer edge face side of the outer core piece, and is in surface contact with the case inclined surface.

The reactor of the present disclosure can maintain a state in which the core pieces are in contact with each other, and is also excellent in terms of manufacturability, as will be described below.

Contact State

In the reactor of the present disclosure, the case inclined surface is provided on at least one of the first opposing face and the second opposing face of the inner wall surface of the case that are arranged so that outer edge faces of the two outer core pieces are interposed therebetween. This case inclined surface and the core inclined surface on the outer core piece side are in surface contact with each other. Due to this surface contact, forces (hereinafter, sometimes referred to as "pressing forces") for pressing the two outer core pieces in a direction in which they come close to each other are exerted on the two outer core pieces. If the magnetic core included in the reactor of the present disclosure includes a core piece interposed between the two outer core pieces, due to the above-described pressing forces, a state in which the core piece is interposed between the outer core pieces is maintained. Also, a state in which the adjacent core pieces are in contact with each other is maintained. Such a reactor can maintain the state (contact state) in which the adjacent core pieces are in contact with each other even if they are not joined to each other with an adhesive or the like. Specifically, the reactor of the present disclosure can ensure, due to the above-described surface contact, a large area of the outer core pieces on which the pressing forces are exerted. Therefore, the contact state of the core pieces is less likely to change. Accordingly, the reactor of the present disclosure can appropriately maintain the state in which adjacent core pieces are in contact with each other for a long period of time, even if they are not joined to each other with an adhesive or the like. Accordingly, it is possible to prevent deterioration in the properties of the reactor due to flux leakage from the core pieces. It is also possible to prevent undesired sound and vibration due to a gap generated between the core pieces, for example. If both of the opposing faces of the case respectively have case inclined surfaces, and core inclined surfaces are provided on the outer core piece side, the pressing forces to be exerted on the outer core pieces are likely to be uniform. Such a reactor is likely to maintain the contact state of the core pieces more appropriately.

Manufacturability

The reactor of the present disclosure does not require an adhesive for joining core pieces as described above. Accordingly, it is possible to omit steps for applying an adhesive, solidifying it, and the like. Also, when, in a state in which the coil and the magnetic core are assembled, the assembly is placed in the case such that the core inclined surface slides on the case inclined surface, the above-described pressing forces are automatically generated. Furthermore, the state in which the magnetic core is assembled in a predetermined shape can be maintained easily and automatically. For these reasons, the reactor of the present disclosure is excellent in terms of manufacturability.

In an example of the reactor according to the present disclosure, the core inclined surface is provided directly on the outer edge face of the outer core piece.

In this aspect, the above-described pressing forces are directly exerted on the outer edge face of the outer core piece. In this respect, this aspect is more likely to maintain the contact state of the core pieces. Also, in this aspect, the number of components is smaller than in a case where the core inclined surface is formed on a member independent from the outer core pieces (see a later-described resin member). For this reason, this aspect is more excellent in terms of manufacturability.

In another example of the reactor), the core inclined surface is provided over the entire outer edge face of the outer core piece.

In this aspect, the above-described pressing force is exerted on substantially the entire outer edge face of the outer core piece. For this reason, this aspect is much more likely to maintain the contact state of the core pieces.

In another example of the reactor, the case includes a protruding portion that protrudes from the inner wall surface to the inward side of the case, the outer core piece has a slit portion into which the protruding portion is fitted, the case inclined surface is provided in the protruding portion, and the core inclined surface is provided on an inner circumferential surface that forms the slit portion.

In this aspect, by fitting the protruding portion of the case into the slit portion of the outer core piece, the outer core pieces are easily and accurately positioned in the case. In this respect, this aspect is more excellent in terms of manufacturability. Also, in this aspect, the moving direction of the outer core pieces can be restricted to the direction along the inclination direction of the core inclined surface. Accordingly, this aspect is much more likely to maintain the contact state of the core pieces.

In an example of the reactor according to the present disclosure, wherein a resin member is provided that is attachable to and detachable from the outer core piece, the resin member is in surface contact with at least a portion of the outer edge face of the outer core piece, and the core inclined surface is provided on the resin member.

In this aspect, a resin member independent from the outer core pieces is required. However, this aspect does not lead to an increase in the size of the outer core piece involved by providing the core inclined surface, and thus the outer core piece is likely to be lightweight. Also, this aspect can realize the outer core piece in a relatively simple shape. This aspect is more excellent in terms of manufacturability in view of easily manufacturing the outer core piece. Furthermore, this aspect can use the resin member made of an insulating material such as resin to increase the electrical insulation properties between the outer core piece and the case. Additionally, there may be a case where, due to the resin member, the manufacturing tolerance of the core piece can be accommodated (see later-described Embodiment 4).

In another example of the reactor, the outer core piece and the resin member have engaging portions that are fitted to each other, and the resin member is attached to the outer core piece with the engaging portions.

In this aspect, the resin member can be easily attached to the outer core piece, and the assembly including the resin member can easily be housed in the case. For these reasons, this aspect is excellent in terms of manufacturability. Also, in this aspect, with the engaging portions, the outer core piece and the resin member are less likely to be displaced with respect to each other. Accordingly, the above-described pressing force is exerted on the outer core piece more reliably via the resin member. For this reason, this aspect is more likely to maintain the contact state of the core pieces.

In an example of the reactor according to the present disclosure, the case inclined surface and the core inclined surface have an inclination angle of 10 degrees or less with respect to a depth direction of the case.

In this aspect, the inclination angle is in the above-described range, and thus the pressing force can be appropriately generated. Also, this aspect can easily reduce an increase in the size of the outer core piece, specifically when the core inclined surface is directly provided on the outer core piece. For this reason, this aspect can easily realize downsizing and weight saving.

In an example of the reactor according to the present disclosure, a sealing resin is provided that fills up the case and covers the assembly.

With the sealing resin, this aspect is likely to maintain the state in which the plurality of core pieces are assembled. Accordingly, this aspect is more likely to maintain the contact state of the core pieces.

In an example of the reactor according to the present disclosure, out of the plurality of core pieces, adjacent core pieces have a recessed portion and a projection portion that are fitted to each other.

In this aspect, during the manufacturing process, adjacent core pieces can easily be positioned and assembled, by fitting the recessed portion of one of the core pieces and the projection portion of the other core piece to each other. Furthermore, the adjacent core pieces are less likely to be displaced. Such an aspect is more excellent in terms of manufacturability, and can more likely to maintain the contact state of the core pieces.

Hereinafter, embodiments of the present disclosure will be described in detail with reference to the drawings. In the drawings, like reference numerals denote objects having like names.

Embodiment 1

Figure 2:
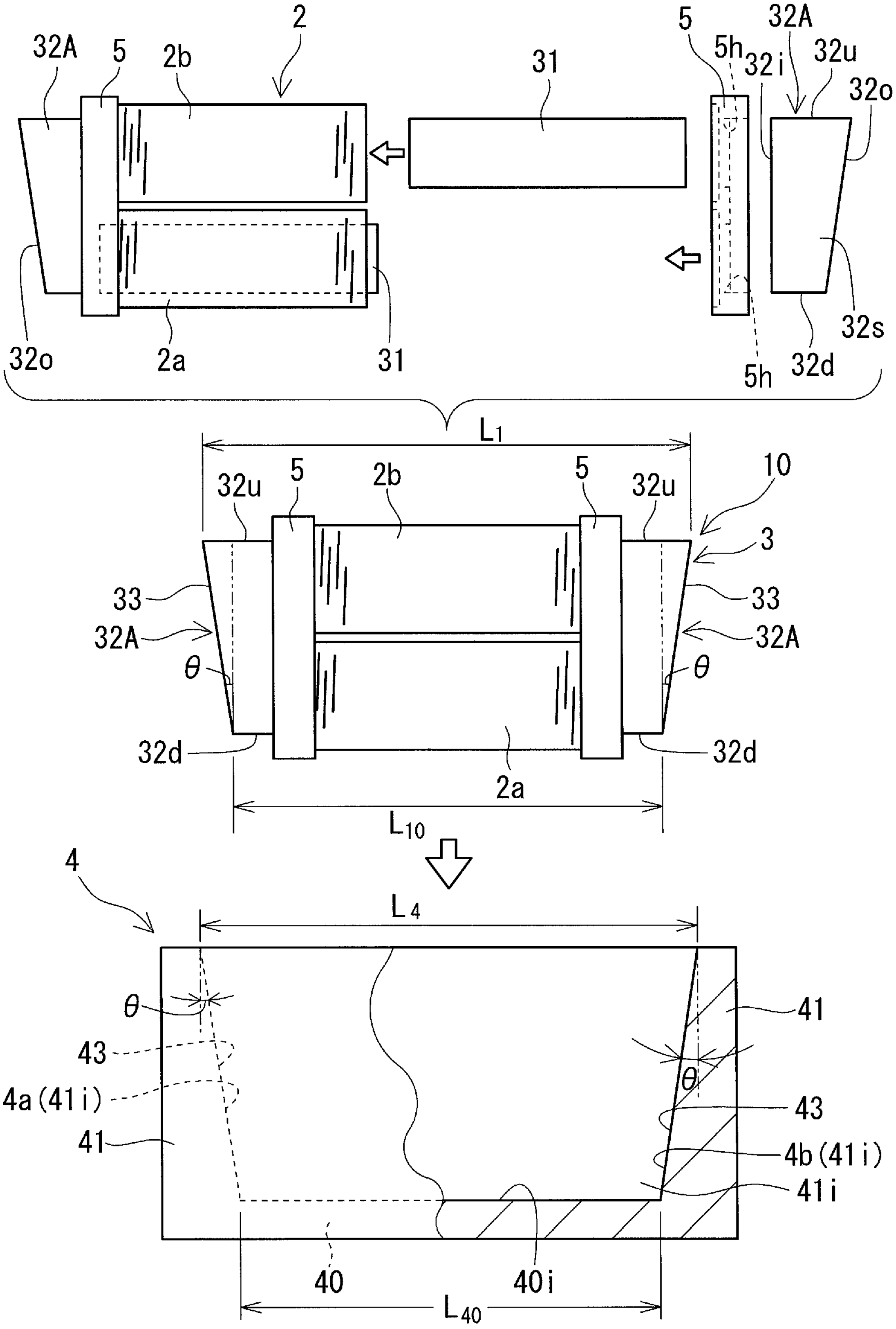
FIG. 2 is a process diagram illustrating a procedure for assembling the reactor of Embodiment 1.

The following will describe a reactor 1A according to Embodiment 1 with reference to FIGS. 1 and 2.

FIG. 1 shows a cross-section taken along a plane parallel to a depth direction of a case 4. FIG. 1 also shows the outer appearance of an assembly 10 out of components housed in the case 4, and shows a sealing resin 9 virtually using a dashed double-dotted line. The same applies to FIGS. 3, 6, and 8, which will be described later.

FIG. 2 shows outer appearance of a part of the case 4, and a cross section of the remaining part thereof when the case 4 is cut.

In FIG. 2 and the later-described drawings, for ease of understanding, an inclination angle θ is shown to appear larger, and may sometimes not satisfy a later-described numerical range.

Reactor

As shown in FIG. 1, the reactor 1A of Embodiment 1 includes: a coil 2 having a winding portion, a magnetic core 3 disposed inside and outside the winding portion, and a case 4 that houses an assembly 10 including the coil 2 and the magnetic core 3. The coil 2 in the present example includes a pair of winding portions 2*a* and 2*b*. The winding portions 2*a* and 2*b* are disposed adjacent to each other with the axes of the winding portions 2*a* and 2*b* parallel to each other. The magnetic core 3 includes a plurality of core pieces that are assembled so as to form a closed magnetic circuit. Specifically, the magnetic core 3 includes, as the core pieces, two outer core pieces 32A that are disposed outside the winding portions 2*a* and 2*b*. In the reactor 1A in the present example, the assembly 10 is housed in the case 4 so that the winding portions 2*a* and 2*b* are disposed vertically adjacent to each other in the depth direction of the case 4 (up-down direction in FIGS. 1 and 2) (hereinafter, the housing aspect is sometimes referred to as "vertically stacked aspect"). In the present example, the winding portion 2*a* is located on a bottom 40 side of the case 4. The reactor 1A in the present example also includes a sealing resin 9 that fills up the case 4, and covers the embedded assembly 10. Such a reactor 1A is used with the bottom 40 of the case 4 typically mounted on an installation target (not shown) such as a converter case. This installation state is an example, and the installation direction of the reactor 1A can be changed as desired.

The case 4 is a tubular container that is closed on one side, and includes the bottom 40 and a side wall portion 41. An inner circumferential surface of the side wall portion 41, that is, an inner wall surface 41*i* surrounds an outer circumferential surface of the assembly 10 housed in the case 4. In the reactor 1A of Embodiment 1, specifically, outer edge faces 32*o* of the outer core pieces 32A, and portions of the inner wall surface 41*i* of the case 4 that are opposed to the outer edge faces 32*o* of the outer core pieces 32A have a shape such that both of the outer core pieces 32A can be pressed in a direction in which they come close to each other. Specifically, the case 4 includes, in the inner wall surface 41*i* thereof, a first opposing face 4*a* and a second opposing face 4*b*, which are respectively opposed to the outer edge faces 32*o* of the outer core pieces 32A, and includes a case inclined surface 43 that is provided on at least one of the first opposing face 4*a* and the second opposing face 4*b*. The case inclined surface 43 is inclined such that a distance between the opposing faces 4*a* and 4*b* becomes smaller from the opening side of the case 4 toward an inner bottom face 40*i* of the case 4. In the present example, both of the opposing faces 4*a* and 4*b* include the case inclined surface 43. Also, the reactor 1A includes a core inclined surface 33 that is provided on the outer edge face 32*o* side of the outer core piece 32A, and is in surface contact with the case inclined surface 43. The reactor 1A in the present example includes two core inclined surfaces 33 that are directly provided on the outer edge faces 32*o* of the respective outer core pieces 32A. Also, in the present example, the core inclined surfaces 33 are provided over the entire outer edge faces 32*o*. In the reactor 1A of Embodiment 1, due to the surface contact between the case inclined surface 43 and the core inclined surface 33, the above-described pressing force is exerted on both of the outer core pieces 32A in a direction in which they come close to each other. The following describes the constituent components in detail.

Coil

The coil 2 in the present example includes the tubular winding portions 2*a* and 2*b* that are formed by winding a winding wire into a spiral shape. The following are aspects of the coil 2 that includes the pair of winding portions 2*a* and 2*b*.

Aspect (1)

The coil 2 includes the winding portions 2*a* and 2*b* that are formed by two independent winding wires, and connecting portions that each connects one of the two end portions of the corresponding one of the winding wires drawn out from the winding portions 2*a* and 2*b*, and the other end portion.

Aspect (2)

The coil 2 includes the winding portions 2*a* and 2*b* that are formed by a single continuous winding wire, and a coupling portion that couples the winding portions 2*a* and 2*b*, and is constituted by a portion of the winding wire that spans the winding portions 2*a* and 2*b*.

In both of the above aspects, the end portions of the winding wires drawn out from the winding portions 2*a* and 2*b* to the outside of the case 4 are used as connections for connection to an external apparatus such as a power supply. The connecting portions of the aspect (1) include an aspect in which the end portions of the winding wires are directly joined to each other by performing welding, pressure bonding, or the like, and an aspect in which the end portions of the winding wires are indirectly connected to each other via a suitable metal fitting or the like. Note that, in FIGS. 1 and 2 and later-described drawings, for ease of description, only the winding portions 2*a* and 2*b* are shown, and the end portions, the connecting portions, and the coupling portion of the winding wires are omitted.

One example of the winding wire is a coated wire that includes a conductor wire made of copper or the like, and an insulating coating that is made of a polyamide imide resin or the like and surrounds the outer circumference of the conductor wire. The winding portions 2a and 2b in this example are each a quadrangular tube-shaped edgewise coil in which the winding wire, which is constituted by a coated rectangular wire, is wound edgewise. Also, the winding portions 2a and 2b have the same specifications in terms of shape, winding direction, and number of turns, for example. An edgewise coil is likely to have a high space factor, and can form a small coil 2. Also, the outer circumferential surface of a quadrangular tube-shaped edgewise coil can include four rectangular sides. As a result of two or more of the above-described four sides being located close to the inner wall surface 41i or the inner bottom face 40i of the case 4, a small reactor 1A can be realized. Furthermore, the case 4 in the present example is made of metal, is excellent in terms of thermal conductivity, and thus also has excellent heat dissipation performance.

Note that the shape, size, and the like of the winding wires and the winding portions 2a and 2b can be changed as desired. For example, the winding wires may be coated round wires, and the winding portions 2a and 2b may be shaped as a tube that does not have corner portions, such as a circular tube or a racetrack tube. Also, the winding portions 2a and 2b may have different specifications from each other.

Magnetic Core

The magnetic core 3 in the present example includes four columnar core pieces. These core pieces are assembled in a frame-shape (ring-shape). Specifically, as shown in FIG. 2, the magnetic core 3 in the present example includes two inner core pieces 31 that are mainly disposed inside the winding portions 2a and 2b respectively, and two outer core pieces 32A that are disposed substantially entirely outside the winding portions 2a and 2b. The intermediate portions of the inner core pieces 31 except for both end portions thereof are housed in the winding portions 2a and 2b. The two end portions of the inner core pieces 31 protrude from the winding portions 2a and 2b, and are used as connection portions for connection to the outer core pieces 32A (FIG. 1). The inner core pieces 31 are disposed with axes thereof parallel to each other, similar to the state in which the winding portions 2a and 2b are disposed. One outer core piece 32A is disposed to span the end portions of the two inner core pieces 31 on one side. The other outer core piece 32A is disposed to span the end portions of the two inner core pieces 31 on the other side. As a result, these four core pieces have a square frame shape, and form a closed magnetic circuit. The magnetic core 3 in the present example does not include a gap material between adjacent core pieces, and the core pieces 31 and 32A are in direct contact with each other (FIG. 1).

Inner Core Piece

The two inner core pieces 31 in the present example have a cuboid shape that substantially corresponds to the inner circumferential shape of the winding portions 2a and 2b, and have the same shape and size. In the present example, only one core piece is housed in one winding portion 2a or 2b. Accordingly, the total number of core pieces is small. Such a magnetic core 3 in the present example can shorten the assembling time.

Outer Core Piece

The two outer core pieces 32A in the present example have substantially a cuboid shape, and have the same shape and size. The following describes one outer core piece 32A as a representative example.

The outer core piece 32A of the present example includes an inner edge face 32i, an outer edge face 32o, an upper face 32u, a lower face 32d, and two side faces 32s (one side face 32s is located on the back side of FIG. 2 in terms of the paper surface, and cannot be seen. The same applies to the later-described FIGS. 4 and 7). The inner edge face 32i is in contact with the edge faces of the inner core pieces 31. The outer edge face 32o is located on the opposite side to the inner edge face 32i. The upper face 32u is disposed on the opening side of the case 4 when the outer core piece 32A is housed in the case 4. The lower face 32d is located on the opposite side to the upper face 32u, and is disposed on the inner bottom face 40i side of the case 4. In the present example, the four faces 32i, 32o, 32u, and 32d are each rectangular. The two side faces 32s are surrounded by these four faces 32i, 32o, 32u, and 32d.

The inner edge face 32i in the present example is a flat face that is disposed so as to be substantially orthogonal to the axial direction of the inner core pieces 31 (here corresponding also to the axial direction of the winding portions 2a and 2b). The inner edge face 32i is also opposed to the edge faces of the winding portions 2a and 2b.

The outer edge face 32o in the present example is a flat face that is disposed so as to non-orthogonally intersect with the above-described axial direction. Accordingly, the outer edge face 32o is non-parallel to the inner edge face 32i. In the present example, the outer edge face 32o is inclined to approach the inner edge face 32i from the upper face 32u toward the lower face 32d, so that the front shape of the side face 32s when it is viewed in a direction orthogonal to the side face 32s is the shape of a right-angled trapezium. That is to say, the outer edge face 32o is inclined such that the distance from the inner edge face 32i to the outer edge face 32o (hereinafter, sometimes referred to as "core thickness") continuously decreases from the upper face 32u side to the lower face 32d side. In the present example, the outer edge face 32o as a whole is inclined in a manner as described above. The front shape of an assembly in which the magnetic core 3 including such outer core pieces 32A is assembled in a ring shape is a trapezoidal shape in which a length L 10 on the lower face 32d side is shorter than a length $L_1$ on the upper face 32u side. It is assumed that the lengths $L_{10}$ and $L_1$ are dimensions along the axial direction.

In the magnetic core 3 in the present example, the above-described outer edge face 32o as a whole forms the core inclined surface 33 that comes into surface contact with the case inclined surface 43. Details of the core inclined surface 33 will be described together with the case inclined surface 43 in the later-described chapter "Relationship between Outer Core Pieces and Case".

Note that the shape, size, the number, and the like of the core pieces constituting the magnetic core 3 are examples, and can be changed as desired (for example, see later-described Modification 4).

Constituent Material

The core pieces may be made of compacts such as those that include a soft magnetic material or those that are typically constituted primarily by a soft magnetic material. Examples of the soft magnetic material include a metal such as iron or an iron alloy (e.g., an Fe—Si alloy or an Fe—Ni alloy), and a non-metal material such as ferrite. Examples of the compacts include: a powder compact obtained by compression molding a powder made of a soft magnetic material, a coated powder that further includes an insulating coating, or the like; a compact of a composite material obtained by solidifying a flowable mixture that includes a soft magnetic powder and a resin; a sintered body such as a ferrite core; and a laminated body obtained by stacking a plate material such as magnetic steel plates.

The constituent material of the inner core pieces 31 and the constituent material of the outer core pieces 32A may be the same or different. Examples of the case where the constituent materials are different include an aspect in which the inner core pieces 31 are made of a composite material compact, and the outer core pieces 32A are made of a powder compact, and an aspect in which both the inner core pieces 31 and the outer core pieces 32A are made of a composite material compact with different types of soft magnetic powders or different amounts of contained soft magnetic powders. In the aspect in which the constituent materials are different, by adjusting the magnetic permeability of the core pieces, it is possible to achieve a magnetic core (magnetic core 3 in the present example) that does not include a gap material.

Interposed Member

The reactor 1A in the present example includes an interposed member made of an insulating material such as a resin. The interposed member is interposed between the coil 2 and the magnetic core 3, and contributes to enhancing the electrical insulation properties of both of the members. The interposed member in the present example includes: a flange member 5 that is interposed between the edge faces of the winding portions 2*a* and 2*b* on one side, and the inner edge face 32*i* of one outer core piece 32A; and a flange member 5 that is interposed between the edge faces of the winding portions 2*a* and 2*b* on the other side, and the inner edge face 32*i* of the other outer core piece 32A. The two flange members 5 have the same shape and size. Thus, one flange member 5 will be described below as a representative example.

The flange member 5 in the present example is a frame-shaped member that includes a plate-shaped base having through holes 5*h* through which the inner core pieces 31 are inserted. The through holes 5*h* are formed in the base so as to be adjacent to each other in a direction (up-down direction in FIG. 2) orthogonal to the axial direction of the winding portions 2*a* and 2*b*, corresponding to the winding portions 2*a* and 2*b* adjacent to each other. The flange member 5 has one recessed portion on the side on which the outer core piece 32A is disposed. This recessed portion has a bottom constituted by one face of the base, and a region of the outer core piece 32A on the inner edge face 32*i* side is fitted into the recessed portion (see a dotted line in FIG. 2). The flange member 5 has two recessed portions on the side on which the coil 2 is disposed. The recessed portions each have a bottom constituted by another face of the base, and regions of the winding portions 2*a* and 2*b* on the edge face side are fitted into the recessed portions (see dotted lines in FIG. 2). The flange member 5 having such a specific shape also functions as a member for positioning the magnetic core 3 with respect to the winding portions 2*a* and 2*b*.

Note that the shape, size, the number, and the like of the interposed member can be changed as desired. As one example, inner interposed members (not shown, see JP 2012-209328A) may be disposed inside the winding portions 2*a* and 2*b*. As another example, the flange member and the inner interposed members are molded into a single member.

The constituent material of the interposed members is various types of resin, such as a thermoplastic resin and a thermosetting resin. Examples of the thermoplastic resin include a polyphenylene sulphide (PPS) resin, a polytetrafluoroethylene (PTFE) resin, a liquid crystal polymer (LCP), a polyamide (PA) resin, a polybutylene terephthalate (PBT) resin, and an acrylonitrile-butadiene-styrene (ABS) resin. Examples of the thermosetting resin include an unsaturated polyester resin, an epoxy resin, a urethane resin, and a silicone resin. The interposed member can be manufactured by a known molding method such as injection molding.

Case

The case 4 functions to mechanically protect the assembly 10, and protect the assembly 10 from the external environment (to improve anticorrosion performance), for example. The case 4 in the present example has an inner space that has the shape and size such that substantially the entirety of the assembly 10 can be housed. Accordingly, the case 4 is more likely to realize the above-described protection functions. Specifically, the case 4 provided in the reactor 1A of Embodiment 1 includes the case inclined surfaces 43 on the inner wall surface 41*i*. Such a case 4 also has a function of maintaining a state in which the magnetic core 3 is assembled in a predetermined shape (in a ring shape, in the present example), that is to say, a state in which adjacent core pieces are in contact with each other.

The case 4 has the shape of, for example, a box that includes the bottom 40, and the side wall portion 41 standing from the bottom 40, and is open to the side opposite to the bottom 40 (upper side in FIGS. 1 and 2). The bottom 40 has the inner bottom face 40*i* to which the lower face side of the assembly 10 (including the lower face of the winding portion 2*a* and the lower face 32*d* of the magnetic core 3, in the present example) is brought close. The side wall portion 41 has the inner wall surface 41*i* that surrounds the side faces of the assembly 10 (including the side faces of the winding portions 2*a* and 2*b*, and the side face 32*s* of the magnetic core 3, in the present example), and the edge faces of the assembly 10 (in the present example, including the outer edge faces 32*o* of the outer core pieces 32A).

The inner circumferential surface of the case 4 in the present example, that is, the inner bottom face 40*i* and the inner wall surface 41*i* are each a flat surface. The shape of the opening, and the planar shape of the inner bottom face 40*i* are rectangular, corresponding to the shape on the lower face side of the assembly 10, and the shape on the upper face side thereof. Of the inner wall surfaces 41*i*, the first opposing face 4*a* that is opposed to the outer edge face 32*o* of one outer core piece 32A, and the second opposing face 4*b* that is opposed to the outer edge face 32*o* of the other outer core piece 32A are provided so as to non-orthogonally intersect with the inner bottom face 40*i*. Therefore, both of the opposing faces 4*a* and 4*b* non-orthogonally intersect with the depth direction of the case 4. In the present example, both of the opposing faces 4*a* and 4*b* are inclined with respect to the inner bottom face 40*i*, so that the cross-section of the space inside the case 4 is trapezoidal when the opposing faces 4*a* and 4*b* and the inner bottom face 40*i* are cut along a plane parallel to the depth direction of the case 4. Specifically, the opposing faces 4*a* and 4*b* are both inclined such that the distance between the opposing faces 4*a* and 4*b* continuously decreases from the opening side of the case 4 toward the inner bottom face 40*i* of the case 4. In the present example, the two opposing faces 4*a* and 4*b* as a whole are inclined in a manner as described above. Of the distances between the opposing faces 4*a* and 4*b*, a distance (length L 40) on the inner bottom face 40*i* side is shorter than a distance (length $L_4$) on the opening side.

In the case 4 in the present example, the two opposing faces 4*a* and 4*b* as a whole respectively serve as the case inclined surfaces 43, and are in surface contact with the outer edge faces 32*o* of the outer core pieces 32A.

The case 4 in the present example is a metal box in which the bottom 40 and the side wall portion 41 are molded into one piece. The metal case 4 is less likely to be subjected to wear or elastic deformation compared to a resin case. Accordingly, the metal case 4 can easily apply the above-described pressing forces to the magnetic core 3 for a long period of time even if the magnetic core 3 is mainly made of iron or the like. Also, metal is excellent in terms of thermal conductivity compared to resin. Accordingly, the metal case 4 can also function as a heat discharge path of the assembly 10, and thus it is possible to realize a reactor 1A that has excellent heat dissipation performance. Specific examples of the constituent material of the case 4 include a nonmagnetic metal such as aluminum or an aluminum alloy.

Relationship Between Outer Core Pieces and Case

The outer edge faces 32*o*, which serve as the core inclined surfaces 33, of the outer core pieces 32A, and the first opposing face 4*a* and the second opposing face 4*b*, which serve as the case inclined surfaces 43, have inclination angles θ substantially equal to each other (FIG. 2), and are in surface contact with each other as a result of being inclined inversely (FIG. 1). Due to this surface contact, pressing forces are exerted on both of the outer core pieces 32A in a direction in which they come close to each other. With the above-described pressing forces, even if adjacent core pieces of the magnetic core 3 (an inner core piece 31 and an outer core piece 32A, in the present example) are not joined to each other with an adhesive or the like, it is possible to maintain the state in which the adjacent core pieces are in contact with each other. Accordingly, the magnetic core 3 is kept assembled in a ring shape. In the present example, a state in which the inner core pieces 31 are interposed between both of the outer core pieces 32A is maintained. Specifically, the pressing forces are automatically exerted when the assembly 10 is placed in the case 4.

The inclination angle θ of the core inclined surfaces 33 and the inclination angle θ of the case inclined surfaces 43 can be selected as desired in a range from 0 to 90 degrees exclusive. The inclination angle θ is assumed to be an angle of the core inclined surfaces 33 and the case inclined surfaces 43 with respect to the depth direction of the case 4. The larger the inclination angle θ is, the more the sizes of the outer core pieces 32A and the case 4 are likely to increase. Accordingly, it is preferable that the inclination angle θ is small to some extent as long as the above-described contact state of the core pieces due to the pressing forces can be maintained. One example of the inclination angle θ is 10 degrees or less. The larger the inclination angle θ within the range of 10 degrees or less is, the more the pressing forces are likely to increase. The smaller the inclination angle θ within the range of 10 degrees or less is, the more the size of the reactor 1A is likely to decrease. If the inclination angle θ is 5 degrees or less, specifically 1 degree or less, and more specifically 0.5 degrees or less, a smaller reactor 1A is likely to be realized. The inclination angle θ in the present example is about 0.3 degrees.

The inclination angle θ may be obtained typically by directly measuring the outer core piece 32A or the case 4. Alternatively, the inclination angle θ may be obtained by measuring the core thickness of the upper face 32*u* of the outer core piece 32A and the core thickness of the lower face 32*d*, and using the difference between the two core thicknesses, the height of the outer core piece 32A, and the trigonometric ratio. The core thickness may be an average of values obtained by measuring a range between one side face 32*s* to the other side face 32*s* at a plurality of points, or an average of values obtained by measuring the entirety of the above-described range. The height of the outer core piece 32A may be a distance from the upper face 32*u* to the lower face 32*d* (dimension along the depth direction of the case 4).

In the present example, the inclination angle θ of the core inclined surface 33 of one outer core piece 32A and the first opposing face 4*a* is equal to the inclination angle θ of the core inclined surface 33 of the other outer core piece 32A and the second opposing face 4*b*. In this case, the above-described pressing force to be applied to one outer core piece 32A due to the surface contact and the pressing force to be applied to the other outer core piece 32A are likely to be uniform. Furthermore, the outer core pieces 32A and the case 4 are likely to have a simple shape, are easily to be manufactured, and are also likely to be downsized. Accordingly, it is possible to realize a small reactor 1A. A configuration is also possible in which one inclination angle θ is different from the other inclination angle θ.

In the present example, the length $L_{40}$ of the case 4 on the bottom 40 side is shorter than the length $L_{10}$ of the assembly 10 on the lower face side ($L_{40}<L_{10}$). Also, the length $L_4$ of the case 4 on the opening side is longer than the length $L_1$ of the assembly 10 on the upper face side ($L_4>L_1$). Therefore, when the assembly 10 is to be placed in the case 4, by sliding the core inclined surfaces 33 of the assembly 10 on the case inclined surfaces 43, the movement of the assembly 10 to the inner bottom face 40*i* side of the case 4 is automatically stopped at the position at which the distance between the opposing faces 4*a* and 4*b* of the case 4 corresponds to the length $L_{10}$. In the present example, as shown in FIG. 1, the two edge faces (outer edge faces 32*o*) of the assembly 10 housed in the case 4 are supported in a state of being in surface contact with the inner wall surface 41*i* (opposing faces 4*a* and 4*b*) of the case 4. The lower face of the assembly 10 is kept floated from the inner bottom face 40*i* without being in contact with the inner bottom face 40*i*.

Furthermore, the case 4 in the present example has a depth such that the assembly 10, when housed therein, does not protrude from the case 4. Accordingly, the length along the inclination direction of the case inclined surface 43 (hereinafter, referred to as "oblique side length") can be set to be longer than the length (inclination length) along the inclination direction of the core inclined surface 33. If the oblique side length of the case inclined surface 43 is longer than the oblique side length of the core inclined surface 33, the core inclined surface 33 and the case inclined surface 43 appropriately come into surface contact with each other regardless of a variation in manufacturing tolerance of the assembly 10. The reason is that, although the position of the assembly 10 within the case 4 along the depth direction of the case 4 may vary up or down, the assembly 10 is completely housed within the case 4, and thus the entire core inclined surfaces 33 can be in surface contact with the case inclined surfaces 43. The oblique side length of the case inclined surface 43 is longer than the oblique side length of the core inclined surface 33, and can be adjusted as desired as long as the adjustment does not incur an increase in the size of the case 4. The case inclined surface 43 in the present example reaches the inner bottom face 40*i* from the opening edge of the case 4. Alternatively, if the case inclined surface 43 has an inclination length longer than the oblique side length of the core inclined surface 33, the case inclined surface 43 may also be provided so as not to reach at least one of the opening edge and the inner bottom face 40*i*.

Since, as described above, the assembly 10 housed in the case 4 does not protrude from the case 4, the upper face of the assembly 10 is located at a position lower than the opening portion of the case 4. Accordingly, in a state in which the case 4 is filled with the later-described sealing resin 9, the embedded assembly 10 is covered by the sealing resin 9 except for the end portions of the above-described winding wires.

Sealing Resin

The sealing resin 9 fills up the case 4 and covers the assembly 10. Such a sealing resin 9 has various functions such as achieving integration of the assembly 10, mechanically protecting the assembly 10, protecting the assembly 10 from the external environment (improving anticorrosion performance), improving electrical insulation properties between the assembly 10 and the case 4, and improving the strength and rigidity of the reactor 1A due to the integration of the assembly 10 and the case 4. Depending on the material of the sealing resin 9, an improvement in heat dissipation performance can also be expected. The sealing resin 9 in the present example covers substantially the entirety of the assembly 10 as described above, and thus it is easier for the sealing resin 9 to have the above-described integration function, protection function, and the like.

Examples of the resin of which the sealing resin 9 is made include an epoxy resin, a urethane resin, a silicone resin, an unsaturated polyester resin, and a PPS resin. In addition to the above-described resin components, a resin that contains a filler excellent in terms of thermal conductivity or a filler excellent in terms of electrical insulating property may be used as the sealing resin 9. Examples of the filler include a filler made of a non-metal inorganic material. Examples of the non-metal inorganic material include an oxide such as alumina, silica, and a magnesium oxide, a nitride such as a silicon nitride, an aluminum nitride, and a boron nitride, ceramics such as carbide, e.g., a silicon carbide, and a nonmetal element such as a carbon nanotube. Moreover, a known resin composition can be used as the sealing resin 9.

Reactor Manufacturing Method

The reactor 1A of Embodiment 1 may be manufactured by a manufacturing method that includes, for example, a step of assembling together the coil 2, the magnetic core 3, and the interposed members (in the present example, flange members 5) as needed to form the assembly 10, and a step of placing the assembly 10 in the case 4. If the sealing resin 9 is to be provided, the manufacturing method may further include a step of filling the case 4 with the sealing resin 9 to cover the assembly 10 embedded in the case 4. When the assembly 10 is to be placed in the case 4, the assembly 10 is moved such that the core inclined surfaces 33 of the assembly 10 slide on the case inclined surfaces 43 as described above. As a result, it is possible to place the assembly 10 in the case 4 while automatically positioning the assembly 10 at a predetermined position in the case 4. The case inclined surface 43 functions as a guide for the assembly 10, and thereby it is easy to perform a placing operation. Furthermore, due to the placing operation, the above-described surface contact state can be formed automatically.

Note that, before being placed in the case 4, the assembly 10 can be temporary fixed together with an adhesive tape or the like. The temporary fixed assembly 10 is easy to handle. Therefore, it is easy to perform an operation for placing the assembly 10 in the case 4. The temporary fixing material can be removed after the assembly 10 is placed in the case 4. Of course, the temporary fixing may be omitted.

Usage

The reactor 1A of Embodiment 1 can be used as a part in a circuit for performing voltage step-up or step-down operations, such as a constituent component of any of various types of converters and power conversion apparatuses. Examples of such converters include on-board converters (typically DC-DC converters) for installation in vehicles such as hybrid automobiles, plug-in hybrid automobiles, electric automobiles, and fuel cell automobiles, and converters in air conditioners.

Main Effects

The reactor 1A of Embodiment 1 includes the core inclined surface 33 and the case inclined surface 43, and as a result of the two inclined surfaces coming into surface contact with each other, forces for pressing the two outer core pieces 32A in a direction in which they come close to each other as described above is exerted on the two outer core pieces 32A. Such a reactor 1A of Embodiment 1 can appropriately maintain the state in which adjacent core pieces are in contact with each other for a long period of time, even if they are not joined to each other with an adhesive or the like. Due to the fact that it is possible to maintain the state in which adjacent core pieces are in contact with each other, the reactor 1A of Embodiment 1 can prevent deterioration in the properties due to flux leakage from the core pieces, undesired sound and vibration due to a gap occurring between the core pieces, and the like.

Also, no adhesive is required for joining the core pieces. Furthermore, by sliding the core inclined surface 33 on the case inclined surface 43 to place the assembly 10 in the case 4, the pressing force is automatically generated. Moreover, the magnetic core 3 is automatically mounted. With these configurations, the reactor 1A of Embodiment 1 is also excellent in terms of manufacturability. The reactor 1A in the present example directly includes the core inclined surfaces 33 on the outer edge faces 32*o* of the outer core pieces 32A, and thus includes the small number of components, which contributes to excellent manufacturability.

Also, the reactor 1A in the present example can easily maintain a state in which adjacent core pieces are in contact with each other for a period of time, also in view of the following points:

(1) The case 4 is made of metal, and the case inclined surface 43 is less likely to become worn during manufacturing or deform during the use of the reactor 1A, compared to a case where it is made of resin. Accordingly, a pressing force caused by the above-described surface contact can be exerted on the outer core piece 32A for a period of time;

(2) The reactor 1A includes the sealing resin 9, and the assembly 10 can be assembled together also with the sealing resin 9; and (3) The reactor 1A includes the core inclined surfaces 33 on the outer edge faces 32*o* of the respective outer core pieces 32A. Also, the entire outer edge faces 32*o* serve as the core inclined surfaces 33, respectively. Furthermore, the reactor 1A includes the case inclined surfaces 43 on the respective opposing faces 4*a* and 4*b* of the case 4. With these configurations, the pressing forces that are exerted on the outer core pieces 32A are likely to have a uniform magnitude.

Moreover, the reactor 1A in the present example directly includes the core inclined surface 33 on the outer edge face 32*o*, but the inclination angle θ is 10 degrees or less. Accordingly, an increase in size of the outer core piece 32A due to the core inclined surface 33 can be reduced. In this respect, the reactor 1A is small and lightweight. Also, the reactor 1A in the present example directly includes the core inclined surface 33 on the outer edge face 32*o*, but the reactor 1A has a vertically stacked aspect. Accordingly, if it is assumed that the inclination angle θ and the cross-sectional area of the magnetic path are constant, it is easy to ensure a predetermined cross-sectional area of the magnetic path, and realize a small outer core piece 32A, compared to the later-described horizontally arranged aspect (later-described Modification 3). Also, due to the fact that the inclination angle θ is small as described above, it is easy to ensure a predetermined cross-sectional area of the magnetic path, and realize a small outer core piece 32A.

Embodiment 2

Figure 3:
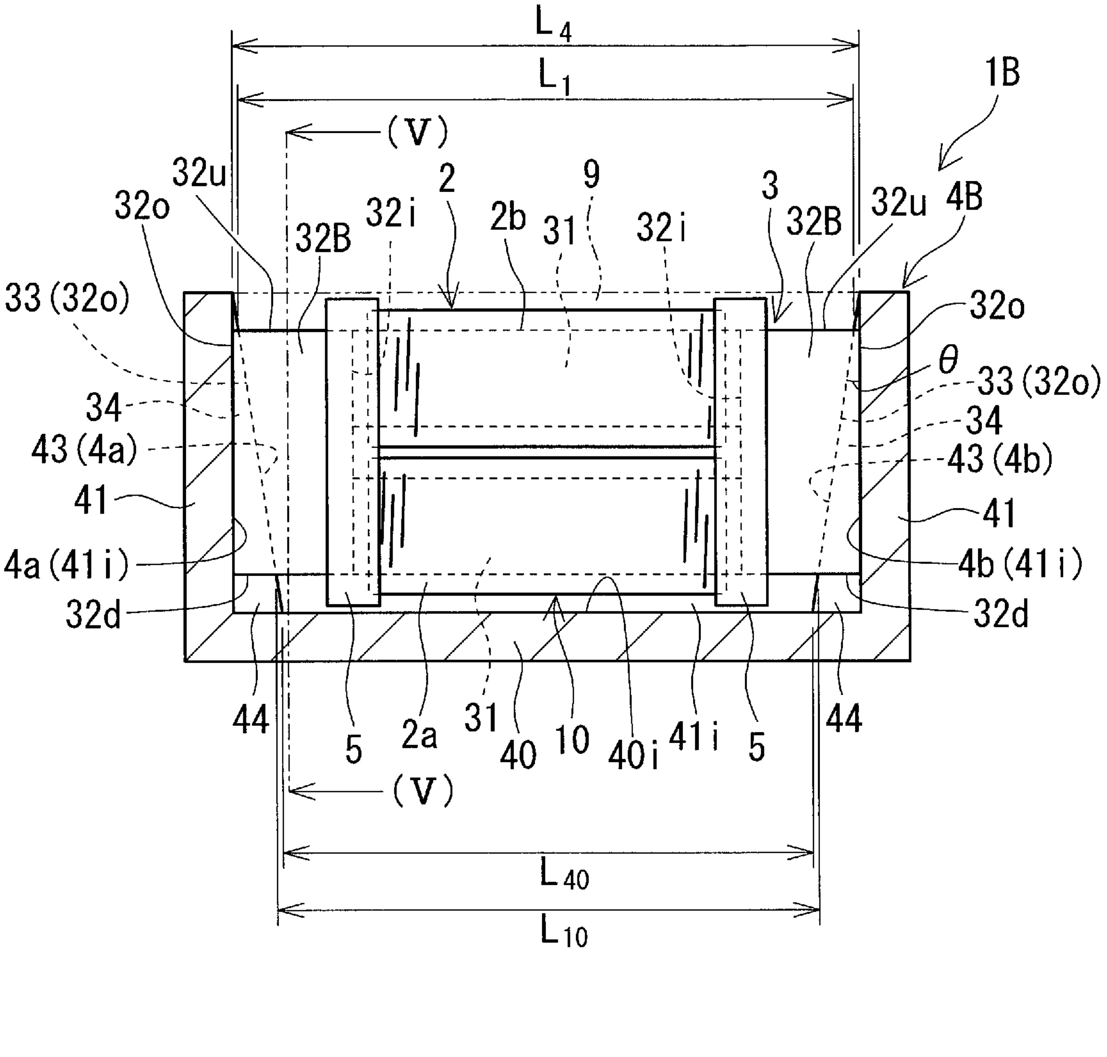
FIG. 3 is a schematic front view illustrating a reactor according to Embodiment 2.
Figure 4:
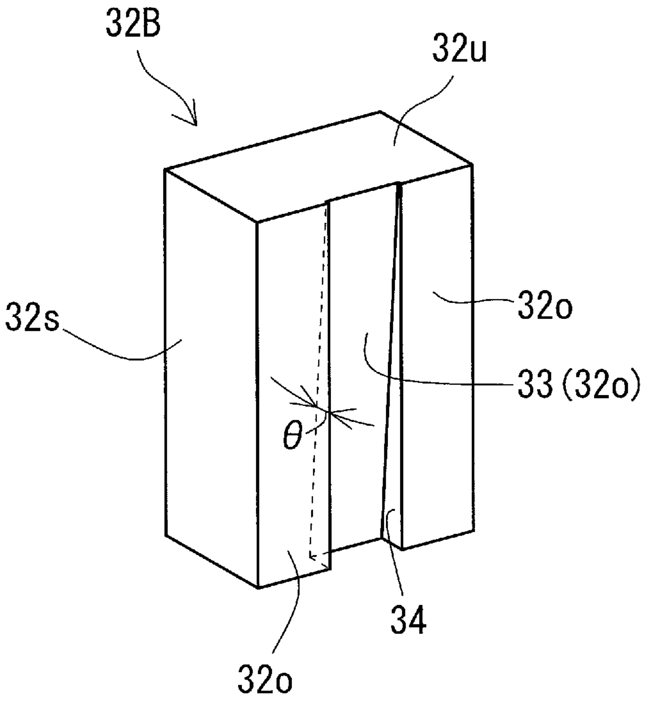
FIG. 4 is a schematic perspective view illustrating an outer core piece that is provided in the reactor of Embodiment 2.
Figure 5:
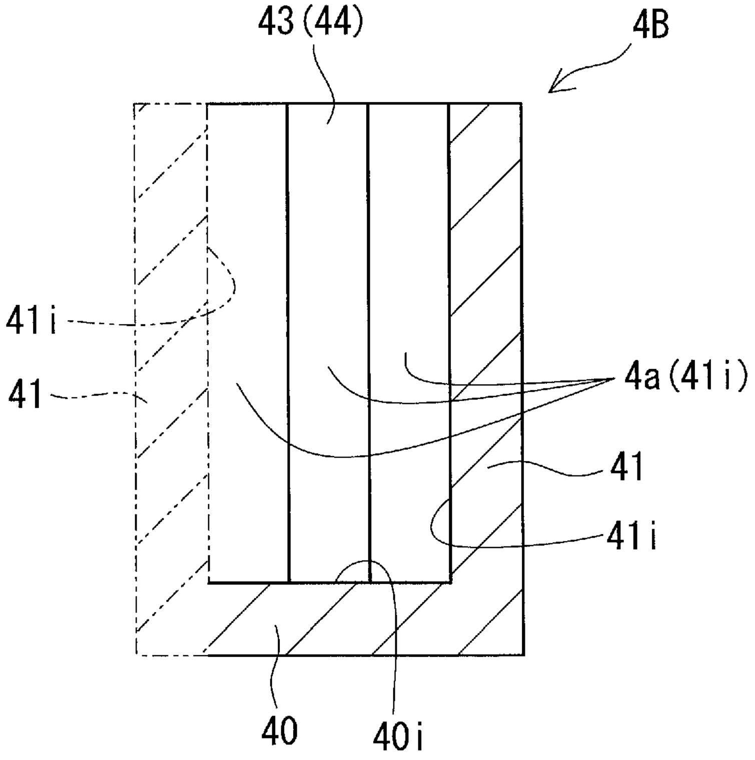
FIG. 5 is a cross-sectional view of a case provided in the reactor of Embodiment 2 taken along a line (V)-(V) shown in FIG. 3.

The following will describe a reactor 1B according to Embodiment 2 with reference to FIGS. 3 to 5.

FIG. 5 shows a cross-section of a case 4B shown in FIG. 3 taken along a plane parallel to the depth direction thereof and is orthogonal to the axial direction of the winding portions 2*a* and 2*b*.

The basic configuration of the reactor 1B of Embodiment 2 is similar to that of the reactor 1A of Embodiment 1, and includes the coil 2, the magnetic core 3 including two outer core pieces 32B, and a case 4B that houses the assembly 10. The core inclined surfaces 33 are directly provided on outer edge faces 32*o* of the outer core pieces 32B. The case 4B includes the case inclined surfaces 43 that are provided on the opposing faces 4*a* and 4*b* opposed to the outer edge faces 32*o*. One of the differences of the reactor 1B of Embodiment 2 from Embodiment 1 is that the core inclined surfaces 33 are not entirely but partially formed on the outer edge faces 32*o* of the outer core pieces 32B. Hereinafter, the differences from Embodiment 1 are described in detail, and detailed descriptions of the configurations and effects that are the same as those of Embodiment 1 are omitted.

The case 4B includes protruding portions 44. The protruding portions 44 protrude from the inner wall surface 41*i* of the case 4B to the inward side of the case 4B. The case 4B in the present example includes the protruding portions 44 on the first opposing face 4*a* and the second opposing face 4*b*, respectively. The case inclined surfaces 43 are provided on the protruding portions 44. The outer core pieces 32B have slit portions 34 (FIG. 4). In the present example, the outer core pieces 32B respectively have slit portions 34. The core inclined surfaces 33 are each provided on the inner circumferential surface that forms the slit portion 34. Each of the protruding portions 44 is fitted into the slit portion 34. In the present example, portions of the case 4B on both sides on which the opposing faces 4*a* and 4*b* are located have the same shape and size. Also, the outer core pieces 32B have the same shape and size. Accordingly, in the following, one of the opposing faces 4*a* and 4*b*, and one of the outer core pieces 32B will be described as representative examples.

In the case 4B in the present example, on the inner wall surface 41*i* of the side wall portion 41, the first opposing face 4*a* that is opposed to the outer edge face 32*o* of the outer core piece 32B has a concavo-convex shape, instead of a uniform plane shape. Specifically, the portion of the inner wall surface 41*i* that is opposed to the outer edge face 32*o* includes a flat portion and a protruding portion 44. The flat portion is constituted by a plane that is parallel to the depth direction of the case 4B (up-down direction in FIGS. 3 and 5). The protruding portion 44 protrudes from this flat portion to the inward side of the case 4B (see also FIG. 5). As shown in FIG. 5, the protruding portion 44 is provided, in an area in which it is opposed to the outer edge face 32*o*, at an intermediate position in a direction (left-right direction in FIG. 5) orthogonal to the depth direction of the case 4B, extending from the opening side of the case 4B to the inner bottom face 40*i* side. Therefore, the opposing face 4*a* includes one protruding portion 44 (later-described inclined surface), and two flat portions arranged on both sides of the protruding portion 44. The same applies to the second opposing face 4*b*.

The protruding portion 44 in the present example has the shape of a triangular column whose front shape is a rectangular triangle shape when viewed in the direction (direction orthogonal to the paper plane of FIG. 3) orthogonal to the depth direction of the case 4B as shown in FIG. 3. This protruding portion 44 has an apex angle of an inclination angle θ that is arranged on the opening side of the case 4B, and a face that is inclined such that a protrusion length from the flat portion to the inside of the case 4B increases from the opening side toward the inner bottom face 40*i*. This inclined surface serves as the case inclined surface 43. The larger the area of the inclined surface is, the more the contact area with the core inclined surface 33 increases. Accordingly, the above-described pressing force is likely to be obtained. It is preferable to adjust the area of the inclined surface so that a predetermined pressing force can be obtained. The area of the inclined surface may be one fourth or more of the area of the outer edge face 32*o*, and preferably one third or more. In FIG. 5, an example is given in which the area of the inclined surface (case inclined surface 43) is about one third of the outer edge face 32*o*. The inclination angle θ is an angle with respect to the depth direction of the case 4B.

Also, in the present example, the protruding portion 44 on the first opposing face 4*a* side, and the protruding portion 44 on the second opposing face 4*b* side are provided so that the above-described inclined surfaces are opposed to each other. Furthermore, the two protruding portions 44 are provided so that the distance between the two inclined surfaces decreases from the opening side of the case 4B toward the inner bottom face 40*i*. The distance between the flat portion on the first opposing face 4*a* side and the flat portion on the second opposing face 4*b* side is uniform from the opening side toward the inner bottom face 40*i*.

The outer core piece 32B in the present example has a substantially cuboid shape as shown in FIG. 4. Similar to the outer core piece 32A described in Embodiment 1, the outer core piece 32B includes an inner edge face 32*i* (FIG. 3), an outer edge face 32*o*, an upper face 32*u*, a lower face 32*d* (FIG. 3), and two side faces 32*s*. A portion of the outer edge face 32*o* in the present example is partially recessed. This recess serves as the slit portion 34. The remaining portion of the outer edge face 32*o* is substantially parallel to the inner edge face 32*i*, and is arranged so as to be substantially orthogonal to the axial direction of the inner core pieces 31 (FIG. 3). The front shape of the side faces 32*s* is rectangular when viewed in a direction orthogonal to the side face 32*s* (see also FIG. 3). Also, the front shape of the magnetic core 3 including the outer core pieces 32B in a state of being assembled in a ring shape is the shape of a rectangle having a uniform length from the upper face 32*u* side to the lower face 32*d* side (FIG. 3). It is assumed that the above-described length is a dimension along the axial direction of the inner core pieces 31.

The slit portion 34 in the present example is a continuous groove extending from the upper face 32*u* to the lower face 32*d*. Also, the slit portion 34 is open to the three surfaces, namely, the upper face 32*u*, the lower face 32*d*, and the outer edge face 32*o*. Furthermore, the slit portion 34 is provided in the upper face 32*u* and the lower face 32*d* of the outer core piece 32B, at an intermediate position in a direction from one side face 32*s* to the other side face 32*s*. In the present example, the opening of the slit portion 34 on the outer edge face 32*o* side has the shape of a rectangle having a uniform groove width. The groove bottom of the slit portion 34 is inclined such that the groove depth continuously increases from the upper face 32*u* side toward the lower face 32*d*. Accordingly, the cross-sectional area of the slit portion 34 continuously increases from the upper face 32*u* side toward the lower face 32*d*. Also, the groove bottom is inclined at the inclination angle θ. The inclination angle θ is an angle with respect to a direction from the upper face 32*u* side toward the lower face 32*d* (corresponding to the depth direction of the case 4B of the reactor 1B).

In the magnetic core 3 in the present example, the groove bottom of the above-described slit portion 34 forms the core inclined surface 33 that comes into surface contact with the case inclined surface 43. Since the groove bottom of the slit portion 34 forms a part of the outer edge face 32*o*, the core inclined surface 33 in the present example can be said to be directly provided on a part of the outer edge face 32*o*.

During a procedure for manufacturing the reactor 1B, the protruding portions 44 of the case 4B are fitted into the slit portions 34 of the assembly 10. Then, the assembly 10 is moved such that the core inclined surfaces 33 of the slit portions 34 slide on the case inclined surfaces 43 of the protruding portions 44, and thereby the assembly 10 can be housed in the case 4B. Here, the lengths $L_{40}$ and $L_4$ between the two protruding portions 44 of the case 4B are compared to the lengths $L_{10}$ and $L_1$ between the inclined surfaces of the two slit portions 34 of the assembly 10. In the present example, the length $L_{40}$ on the bottom 40 side is shorter than the length L 10 on the lower face 32*d* side ($L_{40}<L_{10}$). The length L 4 on the opening side is longer than the length L 1 on the upper face 32*u* side ($L_4>L_1$). Therefore, similar to Embodiment 1, when the assembly 10 is slit as described above, the movement of the assembly 10 toward the inner bottom face 40*i* of the case 4B is automatically stopped at the position at which the distance between the protruding portions 44 corresponds to the length $L_{10}$.

Similar to Embodiment 1, the reactor 1B of Embodiment 2 can appropriately maintain, for a period of time, a state in which adjacent core pieces are in contact with each other without being joined to each other with an adhesive or the like, by the core inclined surface 33 and the case inclined surface 43 being in surface contact with each other, and is also excellent in terms of manufacturability. Specifically, the reactor 1B of Embodiment 2 can easily and accurately perform positioning of the outer core pieces 32B with respect to the case 4B, by the protruding portions 44 of the case 4B being fitted into the slit portions 34 of the outer core pieces 32B. Accordingly, the reactor 1B of Embodiment 2 is more excellent in terms of manufacturability. Also, with the above-described fitting, the moving direction of the outer core pieces 32B is restricted to the direction along the inclination direction of the core inclined surfaces 33. Accordingly, it is much easier for the reactor 1B of Embodiment 2 to maintain the state in which the core pieces are in contact with each other.

Embodiment 3

Figure 6:
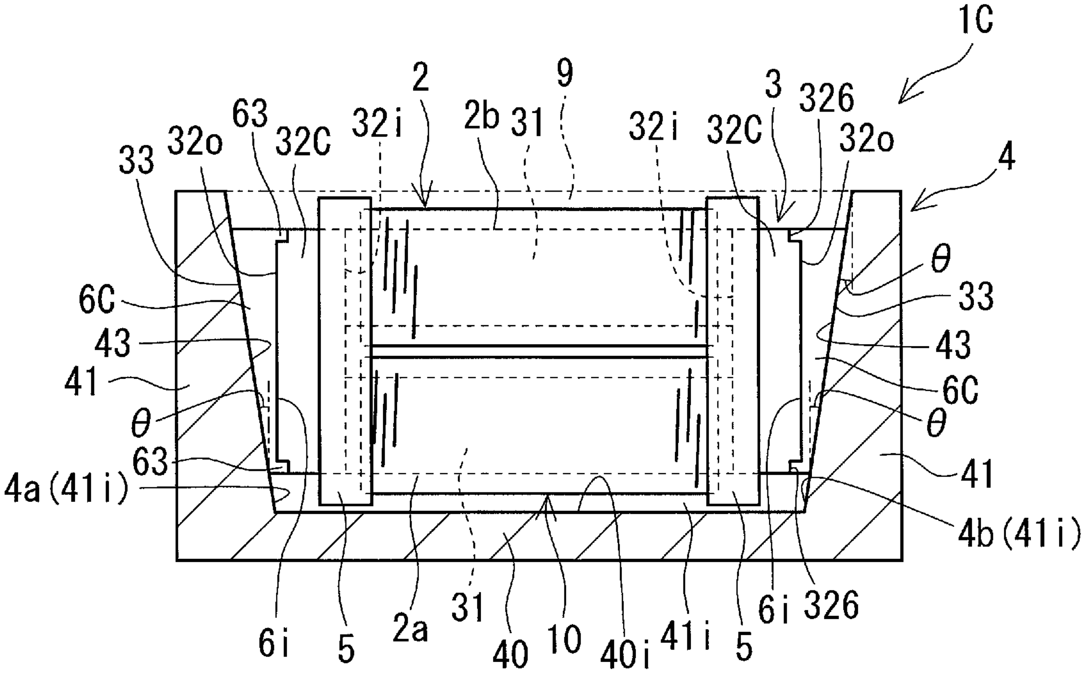
FIG. 6 is a schematic front view illustrating a reactor according to Embodiment 3.
Figure 7:
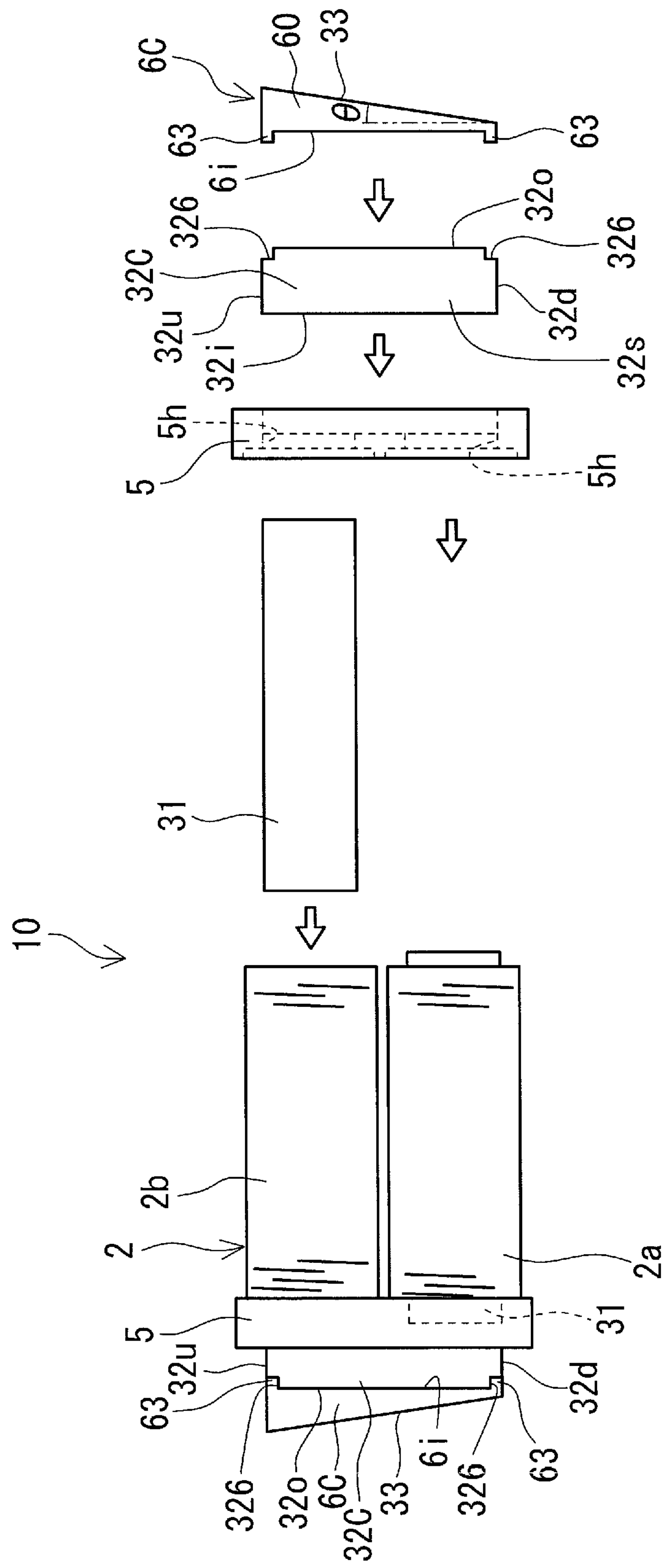
FIG. 7 is a process diagram illustrating a procedure for assembling an assembly that is provided in the reactor of Embodiment 3.

The following will describe a reactor 1C according to Embodiment 3 with reference to FIGS. 6 and 7.

The basic configuration of the reactor 1C of Embodiment 3 is similar to that of the reactor 1A of Embodiment 1, and includes the coil 2, the magnetic core 3 including two outer core pieces 32C, and the case 4 that houses the assembly 10. The reactor 1C also includes the core inclined surfaces 33 on the outer edge faces 32*o* side of the outer core pieces 32C. The case 4 includes the case inclined surfaces 43 that are provided on the opposing faces 4*a* and 4*b*. One of the differences of the reactor 1C of Embodiment 3 from Embodiment 1 is that resin members 6C are provided that are respectively attached to the outer core pieces 32C, and the core inclined surfaces 33 are provided on the respective resin members 6C, instead of being directly provided on the outer core pieces 32C. Hereinafter, the differences from Embodiment 1 are described in detail, and detailed descriptions of the configurations and effects that are the same as those of Embodiment 1 are omitted. In the present example, the outer core pieces 32C have the same shape and size. Also, the resin members 6C have the same shape and size. Accordingly, in the following, either one of the outer core pieces 32C will be described as a representative example. Note that the configuration of the case 4 is the same as the configuration described in Embodiment 1.

The outer core piece 32C in the present example has a substantially cuboid shape except for two corner portions, which will be described later. The outer core piece 32C includes, as shown in FIG. 7, an inner edge face 32*i*, an outer edge face 32*o*, an upper face 32*u*, a lower face 32*d*, and two side faces 32*s*. Substantially the entirety of the outer edge face 32*o* is substantially parallel to the inner edge face 32*i*. Also, the outer edge face 32*o* is arranged so as to be substantially orthogonal to the axial direction of the inner core pieces 31. The front shape of the side faces 32*s* is substantially rectangular when viewed in a direction orthogonal to the side face 32*s*. The front shape of the magnetic core 3 including the outer core pieces 32C in a state of being assembled in a ring shape has the shape of a rectangle having a uniform length from the upper face 32*u* side to the lower face 32*d* side (FIG. 6). It is assumed that the above-described length is a dimension along the axial direction of the inner core pieces 31.

In the reactor 1C in the present example, the outer core piece 32C and the resin member 6C respectively include engaging portions that are fitted to each other. With the engaging portions, the resin member 6C is attached to the outer core piece 32C. In the outer core piece 32C, a corner portion of the outer edge face 32*o* on the upper face 32*u* side, and a corner portion on the lower face 32*d* side are cut off continuously from one side face 32*s* to the other side face 32*s*. Cut off portions 326 form the engaging portions for engaging with the resin member 6C.

The resin member 6C is a resin compact that is attachable to and detachable from the outer core piece 32C. The resin member 6C is arranged on the outer core piece 32C so as to be in surface contact with a portion of the outer edge face 32*o* of the outer core piece 32C. The resin member 6C in the present example is a cuboid-shaped member whose one face has the shape of a right-angled trapezium, and includes a main body 60, and two engaging projection portions 63. The main body 60 covers substantially the entirety of the outer edge face 32*o*. The engaging projection portions 63 project from the main body 60 toward the outer edge face 32*o*. The engaging projection portions 63 form the engaging portions for engaging with the outer core piece 32C.

The main body 60 in the present example includes a below-described inner side face 6*i*, an inclined surface, an upper face, a lower face, and two side faces. The inner side face 6*i* comes into surface contact with substantially the entirety of the outer edge face 32*o*. The inclined surface is located on the opposite side to the inner side face 6*i*. In a state in which the reactor 1C is assembled, the upper face of the main body 60 is disposed on the opening side of the case 4, and the lower face of the main body 60 is disposed on the inner bottom face 40*i* side. The side faces of the main body 60 are surrounded by the inner side face 6*i*, the inclined surface, the upper face, and the lower face, and have the shape of a right-angled trapezium. In the state in which the reactor 1C is assembled, the inner side face 6*i* is arranged so as to be substantially orthogonal to the axial direction of the inner core pieces 31 (FIG. 6). Also, the inner side face 6*i* is arranged so as to be substantially parallel to the inner edge face 32*i* and the outer edge face 32*o* of the outer core piece 32C as shown in FIG. 6 (see also the resin member 6C on the left side of the paper plane of FIG. 7). The inclined surface of the resin member 6C is inclined such that the distance from the inner side face 6*i* to the inclined surface continuously decreases from the upper face side of the resin member 6C toward the lower face thereof. Also, the inclined surface of the resin member 6C is inclined at an inclination angle θ with respect to the inner side face 6*i*. The inclination angle θ is an angle with respect to a direction from the upper face side toward the lower face of the resin member 6C (corresponding to the depth direction of the case 4 of the reactor 1C). In the reactor 1C, the inclined surface of the resin member 6C forms the core inclined surface 33 that comes into surface contact with the case inclined surface 43.

In the resin member 6C in the present example, one engaging projection portion 63 is provided on the upper end side of the inner side face 6*i*, and the other engaging projection portion 63 is provided on the lower end side. Also, in the present example, the engaging projection portions 63 have the same shape and size. One engaging projection portion 63 is a cuboid-shaped projection that is provided continuously from one side face of the main body 60 to the other side face thereof. Also, one engaging projection portion 63 has the shape and the size that correspond to the cut off portion 326. By fitting the engaging projection portions 63 of the resin member 6C into the cut off portions 326 of the outer core piece 32C, the assembly 10 including the resin member 6C can have the core inclined surfaces 33 having the inclination angle θ on the outer edge face 32*o* side. The outer core piece 32C of the resin member 6C has outer appearance similar to that of the outer core piece 32A described in Embodiment 1.

During a procedure for manufacturing the reactor 1C, as shown in FIG. 7, the coil 2, the magnetic core 3 (the inner core pieces 31 and the outer core pieces 32C), and the flange members 5 are assembled. Furthermore, the resin members 6C can be attached to the outer edge faces 32*o* of the outer core pieces 32C, so that the assembly 10 including the resin members 6C is manufactured. In the present example, by fitting the engaging projection portions 63 of the resin member 6C to the cut off portions 326 of the outer core piece 32C, it is possible to easily position the outer core piece 32C and the resin member 6C. When the obtained assembly 10 is to be housed in the case 4, by sliding the core inclined surfaces 33 of the resin members 6C on the case inclined surfaces 43, the assembly 10 can be housed in a similar manner to that of Embodiment 1. In the reactor 1C, of the distances between the two opposing faces 4*a* and 4*b* of the case 4, the length on the inner bottom face 40*i* side is preferably shorter than the length between the lower ends (end portions on the lower face 32*d* side of the outer core piece 32C) of the two resin members 6C of the assembly 10 including the resin members 6C. Of the distances between the two opposing faces 4*a* and 4*b* of the case 4, the length on the opening side is preferably longer than the length between the upper ends (end portions on the upper face 32*u* side of the outer core piece 32C) of the two resin members 6C of the assembly 10. The length from the inner side face 6*i* of the resin member 6C to the inclined surface (core inclined surface 33) can be adjusted based on the size of the outer core piece 32C, so that the above-described lengths are satisfied. It is assumed that the above-described lengths are dimensions along the axial direction of the inner core pieces 31.

For the resin that constitutes the resin member 6C, the above-described resin that constitutes the interposed member can be referenced. Also, the shape, size, formation positions, and the like of the cut off portions 326 and the engaging projection portions 63 are examples, and the shape, size, formation positions, and the like of the engaging portions can be changed as desired. For example, a configuration is also possible in which the resin member 6C has cut off portions, and the outer core piece 32C has projection portions. Alternatively, for example, a recessed portion such as a blind hole may be formed as a cut off portion, and the resin member may have a projection portion that has the shape and the size that correspond to the recessed portion.

In the reactor 1C of Embodiment 3, the core inclined surface 33 of one resin member 6C, and the case inclined surface 43 of the first opposing face 4*a* are in surface contact with each other, and the core inclined surface 33 of the other resin member 6C, and the case inclined surface 43 of the second opposing face 4*b* are in surface contact with each other. As a result, the inner side face 6*i* of one resin member 6C presses against the outer edge face 32*o* of one outer core piece 32C, and the inner side face 6*i* of the other resin member 6C presses against the outer edge face 32*o* of the other outer core piece 32C. In the present example, the inner side face 6*i* of the resin member 6C, and the outer edge face 32*o* of the outer core piece 32C are substantially entirely in surface contact with each other. Accordingly, the inner side face 6*i* is appropriately pressed against the outer edge face 32*o*. Such a reactor 1C of Embodiment 3 can apply force for pressing the two outer core pieces 32C against each other in a direction in which they come close to each other to the two outer core pieces 32C via the resin members 6C. Accordingly, similar to Embodiment 1, the reactor 1C of Embodiment 3 can appropriately maintain a state in which adjacent core pieces are in contact with each other for a period of time using surface contact between the core inclined surface 33 and the case inclined surface 43, even if they are not joined to each other with an adhesive or the like, and is also excellent in terms of manufacturability.

Specifically, in the reactor 1C in the present example, the outer core piece 32C and the resin member 6C are provided with the engaging portions (cut off portions 326 of the outer core piece 32C, and the engaging projection portions 63 of the resin member 6C), so that the two components are less likely to be displaced. Accordingly, the above-described pressing forces can be exerted more reliably, and the state in which the core pieces are in contact with each other is likely to be maintained. Also, with the engaging portions, the assembly 10 including the resin member 6C can be easily assembled together. Furthermore, the resin member 6C is less likely to be removed from the outer core piece 32C, and thus the assembly 10 including the resin member 6C is easily housed in the case 4. Also, in view thereof, the reactor 1C is excellent in terms of manufacturability.

Furthermore, although the reactor 1C of Embodiment 3 needs the resin members 6C that are independent from the outer core pieces 32C, the reactor 1C includes the core inclined surfaces 33 on the resin members 6C, and thus does not need to increase the size of the outer core piece 32C. Accordingly, the outer core pieces 32C are likely to be lightweight. Also, the outer core pieces 32C are likely to have a relatively simple shape. Such outer core pieces 32C are easy to manufacture, and thus the reactor 1C is excellent in terms of manufacturability. Additionally, the resin members 6C are made of an insulating material such as a resin. Accordingly, as a result of the resin member 6C being interposed between the outer core piece 32C and the case 4 made of a metal, it is possible to enhance the electrical insulation properties of these components.

Embodiment 4

Figure 8:
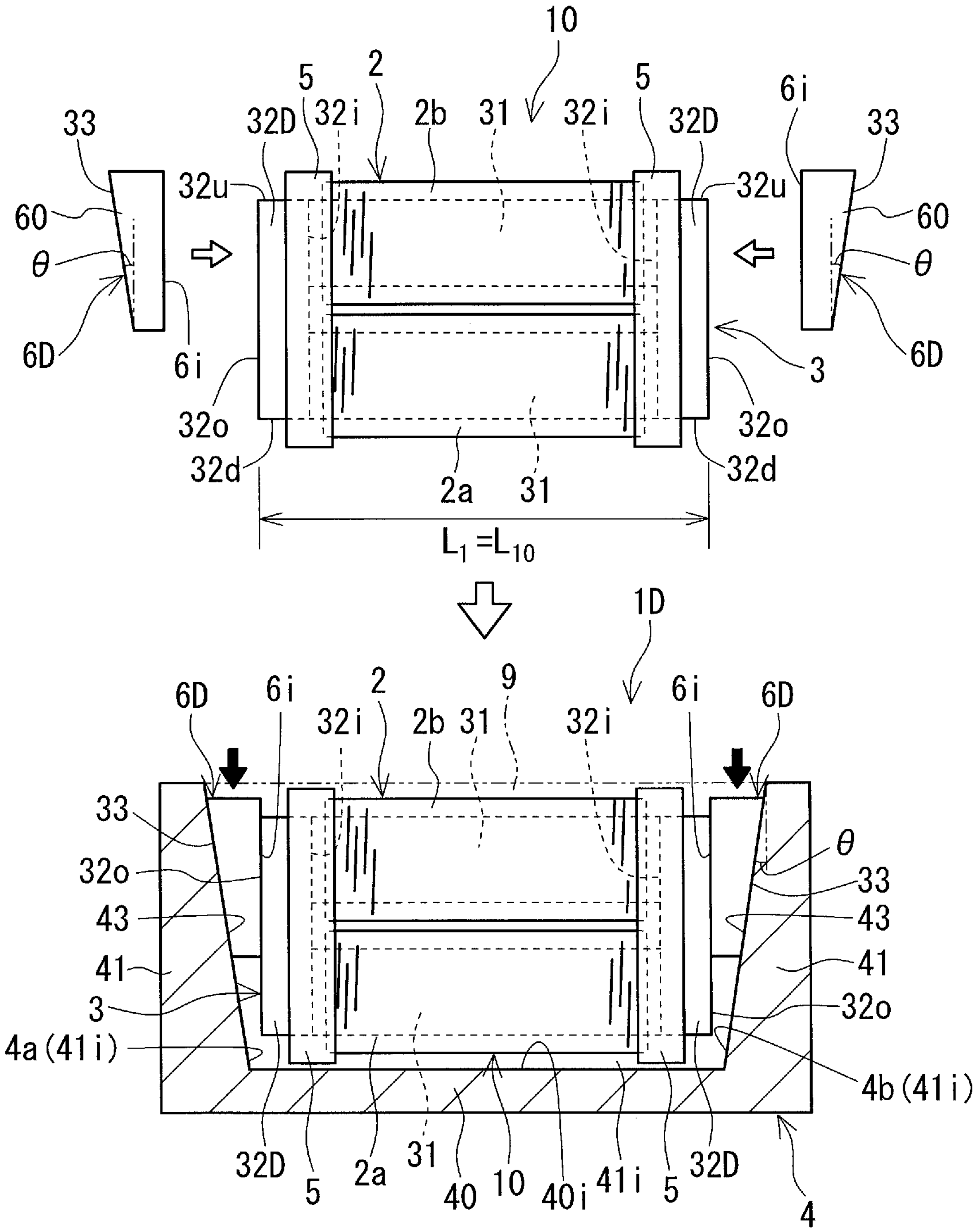
FIG. 8 is a process diagram illustrating a procedure for assembling a reactor according to Embodiment 4.

The following will describe a reactor 1D according to Embodiment 4 with reference to FIG. 8.

The basic configuration of the reactor 1D of Embodiment 4 is similar to that of the reactor 1C of Embodiment 3. The reactor 1D includes the coil 2, the magnetic core 3 including two outer core pieces 32D, resin members 6D that are in surface contact with at least a portion of outer edge faces 32*o* of the outer core pieces 32D, and the case 4 that hoses the assembly 10 including the resin members 6D. Each of the resin members 6D includes an inner side face 6*i* that is in surface contact with at least a portion of the outer edge face 32*o*, and an inclined surface that is located on the opposite side to the inner side face 6*i*, and has an inclination angle θ. This inclined surface forms a core inclined surface 33. One of the differences of the reactor 1D of Embodiment 4 from Embodiment 3 is that the outer core piece 32D and the resin member 6D do not have any engaging portion, and the resin member 6D can change its position with respect to the outer core piece 32D in the depth direction of the case 4. Hereinafter, the differences from Embodiment 3 are described in detail, and detailed descriptions of the configurations and effects that are the same as those of Embodiment 3 are omitted. In the present example, the outer core pieces 32D have the same shape and size. Also, the resin members 6D have the same shape and size. Accordingly, in the following, either one of the resin members 6D will be described as a representative example. Note that the configuration of the case 4 is the same as the configuration described in Embodiment 1.

The outer core piece 32D in the present example has a cuboid shape and corresponds to the core piece 32C described in Embodiment 3 without the cut off portions 326. This outer core piece 32D has a remarkably simple shape, and is excellent in terms of manufacturability. In a state in which the magnetic core 3 including the outer core pieces 32D is assembled in a ring shape, the length $L_1$ on the upper face 32*u* side and the length $L_{10}$ on the lower face 32*d* side are substantially equal to each other ($L_1$=$L_{10}$). The magnetic core 3 assembled in a ring shape has a uniform length from the upper face 32*u* side to the lower face 32*d* side. It is assumed that the above-described length is a dimension along the axial direction of the inner core pieces 31.

The resin member 6D in the present example corresponds to the resin member 6C described in Embodiment 3 without the engaging projection portions 63. The resin member 6D includes a main body 60 whose one face has a cuboid shape of a right-angled trapezium. This resin member 6D has a remarkably simple shape, and is excellent in terms of manufacturability. With respect to the size of the resin member 6D, similar to Embodiment 3, the size of the inner side face 6*i* may be the same as that of the outer edge face 32*o* of the outer core piece 32D, but the resin member 6D in the present example is smaller than the resin member 6C in Embodiment 3. In other words, the area of the inner side face 6*i* of the resin member 6D is smaller than the outer edge face 32*o* of the outer core piece 32D. Also, the size of the inner side face 6*i* in the depth direction of the case 4 (in FIG. 8, the length from the upper face to the lower face of the resin member 6D) is smaller than the size of the outer edge face 32*o* in the depth direction of the case 4. The resin member 6D has the size such that it does not protrude from the case 4 even if, as will be described later, the length $L_1$ of the magnetic core 3 is so long that the insertion depth of the resin member 6D into the case 4 is likely to be small.

The size of the inner side face 6*i* of the resin member 6D can be adjusted in a range in which the pressing forces can be generated. If the inner side face 6*i* is too small, the above-described pressing forces cannot be generated appropriately. If the inner side face 6*i* is too large, there may be a case where, depending on the size of the magnetic core 3, the resin member 6D has a portion that is not housed in the case 4 but protrudes outward. If the case 4 has a large depth, it is possible to prevent the resin member 6D from protruding, but the case 4 is likely to be large. Accordingly, the inner side face 6*i* may be larger than the edge face of one inner core piece 31, preferably about 50% to 95% inclusive of the area of the outer edge face 32*o* and the size of the outer edge face 32*o* along the depth direction of the case 4, and further preferably about 60% to 80% inclusive thereof (in the present example).

Note that the distances between the two opposing faces 4*a* and 4*b* of the case 4 in the reactor 1D can be set to the same values as in Embodiment 3. That is to say, of the above-described distances, the length on the inner bottom face 40*i* side may preferably be shorter than the length between the lower ends of the two resin members 6D of the assembly 10 including the resin members 6D. Of the above-described distances, the length on the opening side may preferably be longer than the length between the upper ends of the two resin members 6D of the assembly 10. The length from the inner side face 6*i* of the resin member 6D to the inclined surface (core inclined surface 33) can be adjusted based on the size of the outer core piece 32D, so that the above-described lengths are satisfied. It is assumed that the above-described lengths are dimensions along the axial direction of the inner core pieces 31.

When the assembly 10 including the resin members 6D is to be placed in the case 4, the respective resin members 6D can be inserted between the outer edge faces 32*o* of the outer core pieces 32D and the case inclined surfaces 43 (opposing faces 4*a* and 4*b*) while sliding thereon. At this time, it is possible to adjust the position of the resin member 6D in the depth direction of the case 4 (insertion depth) with respect to the outer edge face 32*o* of the outer core piece 32D. Here, if the magnetic core 3 includes a plurality of core pieces, the manufacturing tolerances of the core pieces may be summed up, and thus the size (the above-described length $L_1$=$L_{10}$) of the assembled magnetic core 3 may vary. Specifically, the above-described length $L_1$ may be too short or long relative to the distance between the opposing faces 4*a* and 4*b* of the case 4. If, as exemplified in FIG. 8 below, the length $L_1$ is relatively long, the resin members 6D will be automatically positioned at a relatively shallow position in the depth direction of the case 4. If the length $L_1$ is relatively short, the resin members 6D will be automatically positioned at a relatively deep position in the depth direction of the case 4 (a position lower than the position of the resin member 6D shown in FIG. 8 below). In both cases, once the resin member 6D is positioned in the case 4, the entire surface of the inner side face 6*i* is in surface contact with a portion of the outer edge face 32*o* of the outer core piece 32D. Also, the entire core inclined surface 33 is in surface contact with a portion of the case inclined surface 43.

Similar to Embodiment 3, such a reactor 1D of Embodiment 4 can apply force for pressing the two outer core pieces 32D against each other in a direction in which they come close to each other to the two outer core pieces 32D via the resin members 6D. Accordingly, similar to Embodiment 1, the reactor 1D of Embodiment 4 can appropriately maintain a state in which adjacent core pieces are in contact with each other for a period of time using surface contact between the core inclined surface 33 and the case inclined surface 43, even if they are not joined to each other with an adhesive or the like, and is also excellent in terms of manufacturability. Specifically, by adjusting the position of the resin members 6D in the depth direction of the case 4, the reactor 1D of Embodiment 4 can also accommodate variations in size that may be caused by the manufacturing tolerance of the magnetic core 3 or the like.

Embodiment 5

Figure 9:
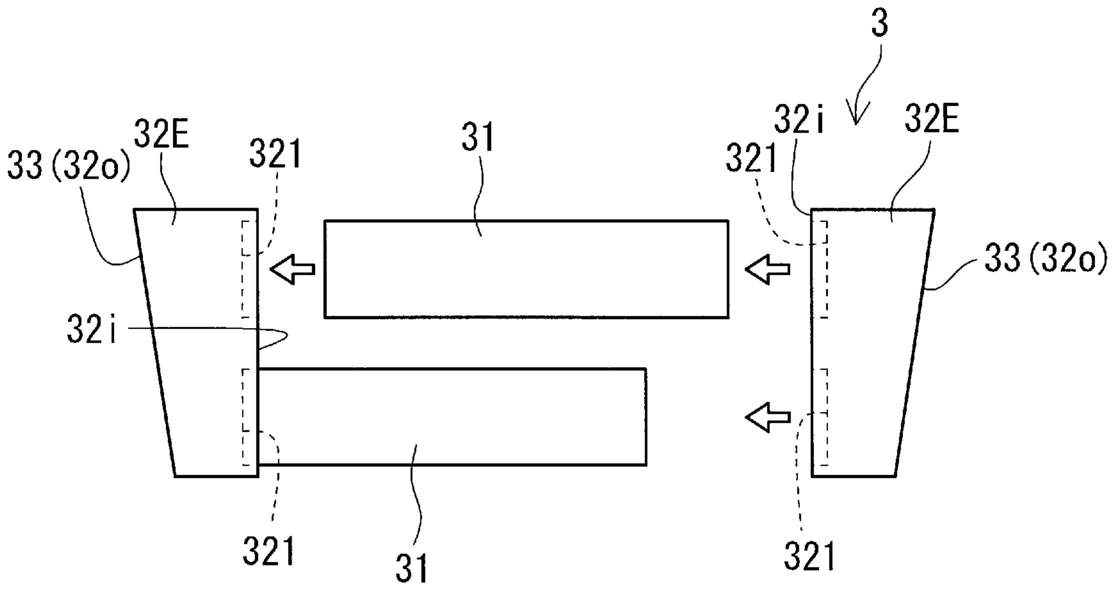
FIG. 9 is a process diagram illustrating a procedure for assembling a magnetic core that is provided in a reactor according to Embodiment 5.

Another example of the magnetic core 3 will be described with reference to FIG. 9.

In Embodiment 1, as the magnetic core 3, a magnetic core 3 has been described in which all of the faces of adjacent core pieces that are in contact with each other, namely, here, the edge faces of the inner core pieces 31 and the inner edge faces 32*i* of the outer core pieces 32A are flat. As another example of the magnetic core 3, a magnetic core 3 may also be used in which, of a plurality of core pieces, adjacent core pieces have a recessed portion and a projection portion that are fitted to each other. In the magnetic core 3 shown in FIG. 9, the inner edge face 32*i* of the outer core piece 32E has recessed portions 321 into which regions of the inner core pieces 31 on the edge face side are respectively fitted. The regions of the inner core pieces 31 on the edge face side form the projection portions.

During the manufacturing procedure, by fitting the regions of the inner core pieces 31 on the edge face side into the recessed portions 321 of the outer core piece 32E, the outer core piece 32E and the inner core pieces 31 are easily positioned. This magnetic core 3 is easy to assemble, and is more excellent in terms of manufacturability in this respect. Also, the outer core piece 32E and the inner core pieces 31 are less likely to be displaced. In the reactor including such a magnetic core 3, if, as described above, the pressing forces are exerted on the outer core pieces 32E in the direction in which the outer core pieces 32E come close to each other, due to the surface contact between the core inclined surfaces 33 and the case inclined surfaces 43 (FIG. 1), the state in which the outer core pieces 32E and the inner core pieces 31 are in contact with each other is more likely to be maintained.

Note that the shape, size, formation positions, and the like of the recessed portions and the projection portions are examples, and can be changed as desired. For example, a configuration is also possible in which the inner core piece 31 has a recessed portion, and the outer core piece 32E has projection portions. Alternatively, for example, a projection portion protrudes from the edge face of the inner core piece 31 or the inner edge face 32*i* of the outer core piece 32E.

The present invention is indicated by the claims rather than being limited to the foregoing examples, and all changes which come within the meaning and range of equivalency of the claims are intended to be embraced therein.

For example, any one or more of the following changes can be made to the above-described reactor of Embodiment 1 or the like.

Modification 1

The magnetic core includes a core inclined surface on the outer edge face of one outer core piece, and does not include a core inclined surface on the outer edge face of the other outer core piece. Alternatively, a resin member having a core inclined surface is provided on the outer edge face of one outer core piece, and no resin member is provided on the outer edge face of the other outer core piece. Also, of the inner wall portion of the case, only the first opposing face includes a case inclined surface, and the second opposing face does not include a case inclined surface. The second opposing face of the case and the outer edge face of the other outer core piece are planes that are orthogonal to the inner bottom face of the case, and are parallel to the depth direction of the case for example, and the two surfaces may be in surface contact with each other.

Also in this case, due to the surface contact between the case inclined surface and the core inclined surface, the pressing forces are exerted on the two outer core pieces in the direction in which they come close to each other. Therefore, the state in which the core pieces are in contact with each other is maintained.

Modification 2

The reactor has a core inclined surface (or slit portion described in Embodiment 2) directly on the outer edge face of one outer core piece, and includes, on the outer edge face of the other outer core piece, a resin member having the core inclined surface described in Embodiments 3 and 4.

In Modification 2, the number of resin members is less than that in Embodiments 3 and 4. Accordingly, the number of steps for assembling the assembly can be reduced, and thus the reactor according to Modification 2 is excellent in terms of manufacturability.

Modification 3

The reactor has, instead of the vertically stacked aspect, a horizontally arranged aspect that will be described below. “Horizontally arranged aspect” refers to an aspect in which in a state in which the assembly is housed in the case, the two winding portions are arranged so that the direction in which the two winding portions are adjacent to each other, and the axial direction of the winding portions are orthogonal to the depth direction of the case.

Modification 4

The core pieces constituting the magnetic core have the following shape.

For example, both of the outer core pieces may be U-shaped core pieces or E-shaped core pieces, or one outer core piece may be an E-shaped core piece, and the other outer core piece may be I-shaped. The U-shaped core piece may include two leg portions housed in the winding portions, and a coupling portion that couples the two leg portions, and is arranged outside the winding portions. The E-shaped core piece may include one central leg housed in a winding portion, two side legs that sandwiches this central leg, and are arranged outside the winding portions, and a coupling portion that couples the central leg and the side legs, and is arranged outside the winding portions. If the E-shaped core piece is provided, one winding portion may be provided. Also, the coupling portion includes an outer edge face. In any case, the total number of core pieces is small, and the number of steps for assembling the assembly can be reduced, thus making it possible to achieve excellent manufacturability.

Alternatively, for example, a plurality of core pieces are housed in one winding portion. This aspect may be used for a case where many gap materials, which will be described later, are included, for example.

Alternatively, for example, the outer circumferential shape of the inner core pieces is not analogous with the inner circumferential shape of the winding portion.

Alternatively, the outer core piece includes a protruding portion having a core inclined surface, and the case includes a slit portion having a case inclined surface.

Modification 5

The magnetic core includes a gap material (not shown) that is interposed between adjacent core pieces.

The gap material may be a plate material or the like that has the shape and size such that it can come into surface contact with edge faces of the core pieces. The constituent material of the gap material may be a nonmagnetic material such as alumina or a resin, a molded plate that is made of a composite material including a resin and magnetic powder, and has a specific magnetic permeability lower than that of the core pieces, or the like. If the adjacent core pieces are in surface contact with each other via the gap material, the above-described pressing forces are exerted, due to the surface contact between the core inclined surface and the case inclined surface, on the outer core pieces in the direction in which they come close to each other. Accordingly, the state in which the core pieces and the gap material interposed between the two outer core pieces are in contact with each other is maintained.

Modification 6

The reactor includes a sensor (not shown) that measures the physical quantity of the reactor, such as a temperature sensor, a current sensor, a voltage sensor, or a flux sensor.

The invention claimed is:

1. A reactor comprising:

a coil having a winding portion;

a magnetic core that is disposed inside and outside the winding portion; and a case that houses an assembly including the coil and the magnetic core, wherein the magnetic core includes a plurality of core pieces that are assembled so as to form a closed magnetic circuit, the core pieces include two outer core pieces that include a portion disposed outside the winding portion, the case includes, on an inner wall surface thereof, a first opposing face and a second opposing face that are respectively opposed to outer edge faces of the outer core pieces, and includes a case inclined surface that is provided on at least one of the first opposing face and the second opposing face, the case inclined surface is inclined such that a distance between the first opposing face and the second opposing face decreases from an opening side of the case toward an inner bottom face of the case, and a core inclined surface is provided on the outer edge face side of the outer core piece, and is in surface contact with the case inclined surface.

2. The reactor according to claim 1, wherein the core inclined surface is provided directly on the outer edge face of the outer core piece.

3. The reactor according to claim 2, wherein the core inclined surface is provided over the entire outer edge face of the outer core piece.

4. The reactor according to claim 2, wherein the case includes a protruding portion that protrudes from the inner wall surface to the inward side of the case, the outer core piece has a slit portion into which the protruding portion is fitted, the case inclined surface is provided in the protruding portion, and the core inclined surface is provided on an inner circumferential surface that forms the slit portion.

5. The reactor according to claim 1, wherein a resin member is provided that is attachable to and detachable from the outer core piece, the resin member is in surface contact with at least a portion of the outer edge face of the outer core piece, and the core inclined surface is provided on the resin member.

6. The reactor according to claim 5, wherein the outer core piece and the resin member have engaging portions that are fitted to each other, and the resin member is attached to the outer core piece with the engaging portions.

7. The reactor according to claim 1, wherein the case inclined surface and the core inclined surface have an inclination angle of 10 degrees or less with respect to a depth direction of the case.

8. The reactor according to claim 1, wherein a sealing resin is provided that fills up the case and covers the assembly.

9. The reactor according to claim 1, wherein, out of the plurality of core pieces, adjacent core pieces have a recessed portion and a projection portion that are fitted to each other.

* * * * *